United States Patent [19]
Hirano

[11] Patent Number: 5,307,277
[45] Date of Patent: Apr. 26, 1994

[54] LOCATION DETECTING APPARATUS

[75] Inventor: Kazuo Hirano, Osaka, Japan

[73] Assignee: Sumitomo Electric Industries, Ltd., Osaka, Japan

[21] Appl. No.: 893,063

[22] Filed: Jun. 3, 1992

[30] Foreign Application Priority Data

Jun. 18, 1991 [JP] Japan .................. 3-146196

[51] Int. Cl.$^5$ .............................. G06F 15/50
[52] U.S. Cl. .................. 364/449; 364/454;
364/457; 342/357; 340/988
[58] Field of Search ............. 364/443, 444, 449, 454,
364/457; 342/357, 451, 457; 340/988, 990, 995;
73/178 R; 33/356, 357

[56] References Cited

U.S. PATENT DOCUMENTS

| | | | |
|---|---|---|---|
| 4,524,357 | 6/1985 | Nakamura | 340/995 |
| 4,890,233 | 12/1989 | Ando et al. | 73/178 R |
| 4,903,212 | 2/1990 | Yokouchi et al. | 342/357 |
| 5,067,083 | 11/1991 | Nakayama et al. | 340/995 |
| 5,151,862 | 9/1992 | Nakayama et al. | 364/454 |
| 5,179,519 | 1/1993 | Adachi et al. | 340/990 |
| 5,220,509 | 6/1993 | Takemura et al. | 340/988 |

OTHER PUBLICATIONS

Patent Abstracts of Japan, vol. 13, No. 358 (P-916) Aug. 10, 1989, & JP-A-11 19 711 (Sony) May 11, 1989.
Patent Abstracts of Japan, vol. 11, No. 370 (P-642) Dec. 3, 1987 & JP-A-62 140 017 (Mazda) Jun. 23, 1987.
Patent Abstracts of Japan, vol. 12, No. 359 (P-762) Sep. 27, 1988 & JP-A-63 109 313 (Pioneer) May 14, 1988.
Patent Abstracts of Japan, vol. 16, No. 131 (P-1332) Apr. 3, 1992 & JP-A-32 93 518 (Clarion) Dec. 25, 1991.

*Primary Examiner*—Gary Chin
*Attorney, Agent, or Firm*—Lane, Aitken & McCann

[57] ABSTRACT

A location detecting apparatus comprising an autonomous location detecting unit mounted in a moving body to calculate a distance traveled by the moving body and an estimated heading of the moving body and to detect an estimated location of the moving body on the basis of the distance traveled and the estimated heading, a receiving unit for detecting a location of the moving body by receiving waves from satellites circling around the Earth in predetermined orbits and for providing location information corresponding to the detected location, a unit to detect a difference of location between the location detected by the receiving unit and the estimated location, a location correcting unit which corrects the estimated location to the location detected by the receiving unit when the difference of location is more than a first predetermined value, a magnetic sensor for detecting an heading of the moving body by sensing a geomagnetic field, and a heading correcting unit which corrects the estimated heading to the heading detected by the magnetic sensor, when the difference of location is more than the first predetermined value after the estimated location was corrected and before the moving body travels a predetermined distance.

2 Claims, 2 Drawing Sheets

LOCATION DETECTING APPARATUS

FIELD OF THE INVENTION

The present invention relates to a location detecting apparatus which is mounted in a moving body such as a vehicle and which detects the current location of the moving body.

DESCRIPTION OF THE PRIOR ART

To provide navigation assistance during travel, there has been employed a vehicle-mounted navigation system which displays a vehicle's current location and the surrounding streets on a display such as a CRT. In the detection of a vehicle's current location in such a navigation system, a so-called "dead reckoning" has been used. In this read reckoning, based on a distance $\delta L$ traveled for a predetermined period of time and a heading $\theta$ at that time, the east-west directional component $\delta x$ ($=\delta L \times \sin \theta$) and south-north directional component $\delta y$ ($=\delta L \times \cos \theta$) of the distance $\delta L$ traveled are calculated. Location coordinate data (Px, Py) representative of a vehicle's current location are then obtained by adding the calculated components $\delta x$ and $\delta y$ to Px' and Py' of the previous location coordinate data (Px', Py'), respectively.

In the detection of the heading $\theta$ of a vehicle, a magnetic sensor or a gyro for sensing the turning angular velocity of a vehicle is employed. However, since the magnetic sensor detects the heading of a vehicle through the detection of a feeble geomagnetic field, a large error will arise in the magnetic sensor output if the degree of magnetization of the vehicle varies. In order to compensate that error, the initialization of the magnetic sensor is generally made. However, when a moving body passes through regions containing magnetic disturbance, such as railroad crossings, places wherein power cables are buried, iron bridges, highways with sound insulating walls and high buildings, the moving body is subjected to the influence of a strong electromagnetic field and therefore the degree of magnetization of the moving body varies. That is, even if the initialization of the magnetic sensor is made, a large error arises again during travel because the degree of magnetization of the moving body varies during travel. Therefore, if the magnetic sensor is used, a large error will occur in the detection of a vehicle's location.

When, on the other hand, the heading of a vehicle is detected through the use of a gyro, a heading change $\delta\theta$ is calculated by integrating the turning angular velocity of the vehicle sensed by the gyro over a predetermined period of time. By adding the calculated heading change $\delta\theta$ to the previous heading $\theta'$, a new heading $\theta$ ($=\theta'+\delta\theta$) is obtained. This new heading will hereinafter be referred to as an estimated heading. However, when the estimated heading is detected by the use of the gyro, because of output errors that the gyro itself inevitably has, the errors are accumulated as the vehicle travels. Consequently, errors will arise in the detection of a vehicle's location. But, the heading detected by the gyro is generally higher in reliability than that detected by a magnetic sensor, because an error in the estimated heading detected based on the gyro output increases gradually and is not an error which increases rapidly in the case of the magnetic sensor.

In recent years, a technique has been proposed which performs two dimensional or three dimensional measurement of a vehicle's location with a high degree of accuracy by measuring the propagation delay times of the waves propagated from GPS (Global Positioning System) satellites circling around the Earth in predetermined orbits. A technique has also been proposed which can apply the above-described technique to the correction of a detection error in the current location obtained by dead reckoning. That is, a GPS receiver for receiving waves from GPS satellites and outputting measurement data is mounted in a vehicle, and an estimated heading obtained by dead reckoning is corrected every a predetermined time with the measurement data from the GPS receiver. In this manner, the estimated heading can be corrected to a correct value before a location detection error becomes large. By this correction, navigation assistance by a navigation system can be provided adequately. Note that, based on a change in a received frequency caused by Doppler effect, data representative of the detected heading of a vehicle are obtained by the GPS receiver. Since the data are obtained taking advantage of Doppler effect, the accuracy in the data are reduced if the vehicle speed is not high. For this reason, the GPS is of no practical use unless a vehicle travels at high speeds.

Although in the above-described technique the estimated location of the vehicle is corrected, errors in the estimated heading obtained based on the output of a gyro are not corrected. For this reason, there is the possibility that the detection of an estimated location after the location correction is made based on an estimated heading containing errors. As a result, if the heading errors are large, there is the possibility that the locus of the estimated location is formed into a serrate shape.

Assume now that vehicles are ferried. In that case, the starting switch of a vehicle is generally in its off state. At this time, the estimated location of a vehicle calculated latest, and the estimated heading obtained latest by integrating the output of a gyro have been stored in the internal memory unit of the navigation system mounted in the vehicle. If the starting switch of the vehicle is turned on after the vehicle has left the ferryboat, the navigation system will start detecting the current location of the vehicle on the basis of the estimated location and heading read out of the internal memory unit of the navigation system. In that case, there is extremely high in the possibility that the location of the vehicle after it has left the ferryboat is completely different from the estimated location stored in the memory unit and that the heading is also completely different from the estimated heading stored in the memory unit. The correction of the estimated location can be made with location data from a GPS receiver, but the estimated heading cannot be corrected. Therefore, unless an accurate heading is supplied to the navigation system before the vehicle start traveling, the location of the vehicle will be detected based on an estimated heading completely different from an actual heading.

It is, accordingly, an important object of the present invention to provide an improved location detecting apparatus which is capable of detecting the location of a moving body accurately by the use of autonomous location detecting means.

SUMMARY OF THE INVENTION

The foregoing object is accomplished in accordance with the present invention by providing a location detecting apparatus comprising autonomous location detecting means and receiving means. The autonomous location detecting means is mounted in a moving body and calculates a distance traveled by the moving body and an estimated heading of the moving body and detects an estimated location of the moving body on the basis of the distance traveled and the estimated heading. The receiving means detects a location of the moving body by receiving waves from satellites circling around the Earth in predetermined orbits and provides location information corresponding to the detected location.

The location detecting apparatus of the present invention further comprises means to detect a difference of location between the location detected by the receiving means and the estimated location detected by the autonomous location detecting means, location correcting means which corrects the estimated location to the location detected by the receiving means when the difference of location is more than a first predetermined value, a magnetic sensor for detecting an heading of the moving body by sensing a geomagnetic field, and heading correcting means. The heading correcting means corrects the estimated heading calculated by the autonomous location detecting means to the heading detected by the magnetic sensor, when the difference of location is more than the first predetermined value after the estimated location was corrected by the location correcting means and before the moving body travels a predetermined distance.

In the present invention, if a difference of location between the estimated location detected by the autonomous location detecting means and the location detected by the receiving means becomes more than a first predetermined value, the estimated location is to be corrected to the location detected by the receiving means. If, after this correction, the difference of location becomes again more than the first predetermined value before the vehicle travels a predetermined distance, the estimated heading of the vehicle obtained by the autonomous location detecting means is corrected to the heading sensed by the magnetic sensor. That is, if, after the correction of the estimated location, a larger difference of location occurs again by a short movement of the vehicle, it can be supposed that the estimated location contains larger errors. Therefore, in such a case, the estimated location is to be corrected to the heading sensed by the magnetic sensor which is higher in reliability.

The location detecting apparatus may further comprise means that, when the difference of location is more than a second predetermined value greater than the first predetermined value, corrects the estimated heading in the autonomous location detecting means to the heading detected by the magnetic sensor independently of whether or not the estimated location was corrected before an occurrence of the greater difference of location. In this construction, when a very large difference of location occurs, the estimated heading is corrected to the heading detected by the magnetic sensor independently of whether or not the estimated location was corrected before an occurrence of the difference. By this, the present invention can be applicable to a case where the location of a moving body cannot be detected by a location detecting apparatus, as in the case that a moving body itself is transported by other moving bodies. For example, when the location detecting apparatus is operated immediately after a moving body itself is transported by other moving bodies, the difference of location between the estimated location and the location detected by the receiving means becomes very large, and, therefore, the estimated heading calculated by the autonomous location detecting means is deteriorated in reliability. Therefore, in that case, the estimated heading is to be corrected to the heading sensed by the magnetic sensor which is higher in reliability.

BRIEF DESCRIPTION OF THE DRAWINGS

The above and other objects and advantages will become apparent from the following detailed description when read in conjunction with the accompanying drawings wherein.

DESCRIPTION OF THE PREFERRED EMBODIMENTS

Figure 1:
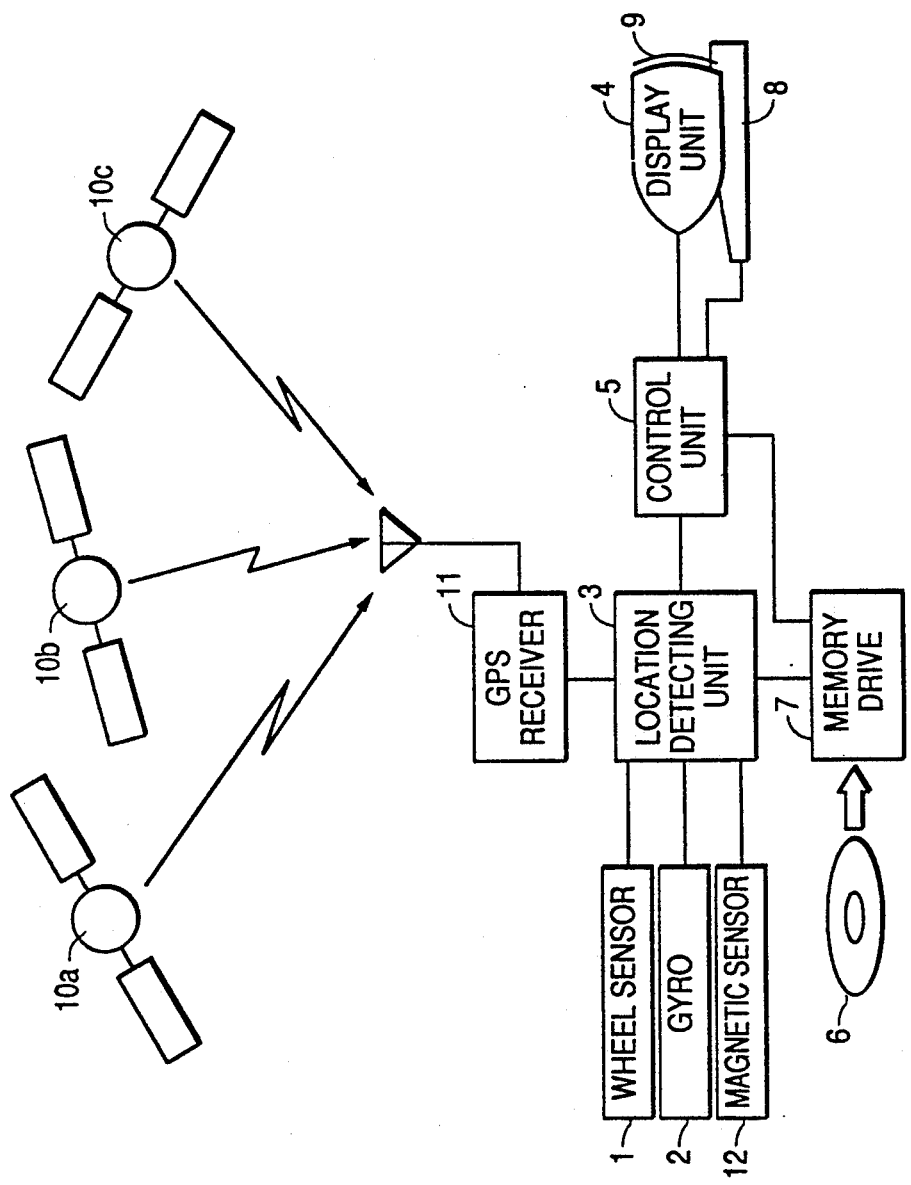
FIG. 1 is a block diagram showing the basic structure of a navigation system to which a location detecting apparatus according to the present invention is applied.

FIG. 1 schematically illustrates a navigation system to which the location detecting apparatus of the present invention is applied. This navigation system is mounted in a vehicle and comprises a wheel sensor 1, a gyro 2 for sensing a turning angular velocity of the vehicle, and a location detecting unit 3 to which the wheel sensor 1 and the gyro 2 are connected. Based on the outputs of the wheel sensor 1 and the gyro 2, the location detecting unit 3 calculates an estimated location of the vehicle. Location data corresponding to the estimated location is supplied to a control unit 5 by the location detecting unit 3. The control unit 5 is constituted by CD-ROM and the like and reads the streets located around the estimated location out of a map memory 6 through a memory drive 7. In this manner, the estimated location is displayed by a display unit 4 comprising CRT and the like, together with the surrounding streets. Reference numeral 8 indicates a console connected to the display unit 4, and reference numeral 9 indicates a touch panel provided on the display surface of the display unit 4.

In this embodiment of the present invention, the wheel sensor 1, the gyro 2 and the location detecting unit 3 as a whole constitute autonomous location detecting means, and the location detecting unit 3 also functions as location correcting means and heading correcting means.

To the location detecting unit 3 is connected a GPS receiver 11 that is receiving means, which detects the current location of a vehicle by receiving the waves propagated from GPS (Global Positioning System) satellites 10a, 10b and 10c circling around the Earth in predetermined orbits and by measuring the propagation delay time of the wave propagated from each satellite. In the location detecting unit 3, the estimated location described above is corrected based on the measurement data that are location information supplied from the GPS receiver 11. A magnetic sensor 12 is connected to the location detecting unit 3 and adapted to sense the heading of a vehicle by sensing a geomagnetic field.

The location detection by the location detecting unit 3 is basically made by dead reckoning that is based on the outputs of the wheel sensor 1 and the gyro 2. That is, the location detecting unit 3 integrates the output of the wheel sensor 1 over a predetermined period of time and also integrates the output of the gyro 2 during this predetermined period of time. By these integrations, the distance traveled by the vehicle is obtained for the predetermined period of time and the heading change of the vehicle is obtained. Therefore, if the accurate location of a vehicle is inputted from the console 8 or touch panel 9 before the vehicle starts traveling, the vehicle's location thereafter can be estimated accurately. The heading of the vehicle obtained by integrating the output of the gyro 2 will hereinafter be referred to as an estimated heading.

Figure 2:
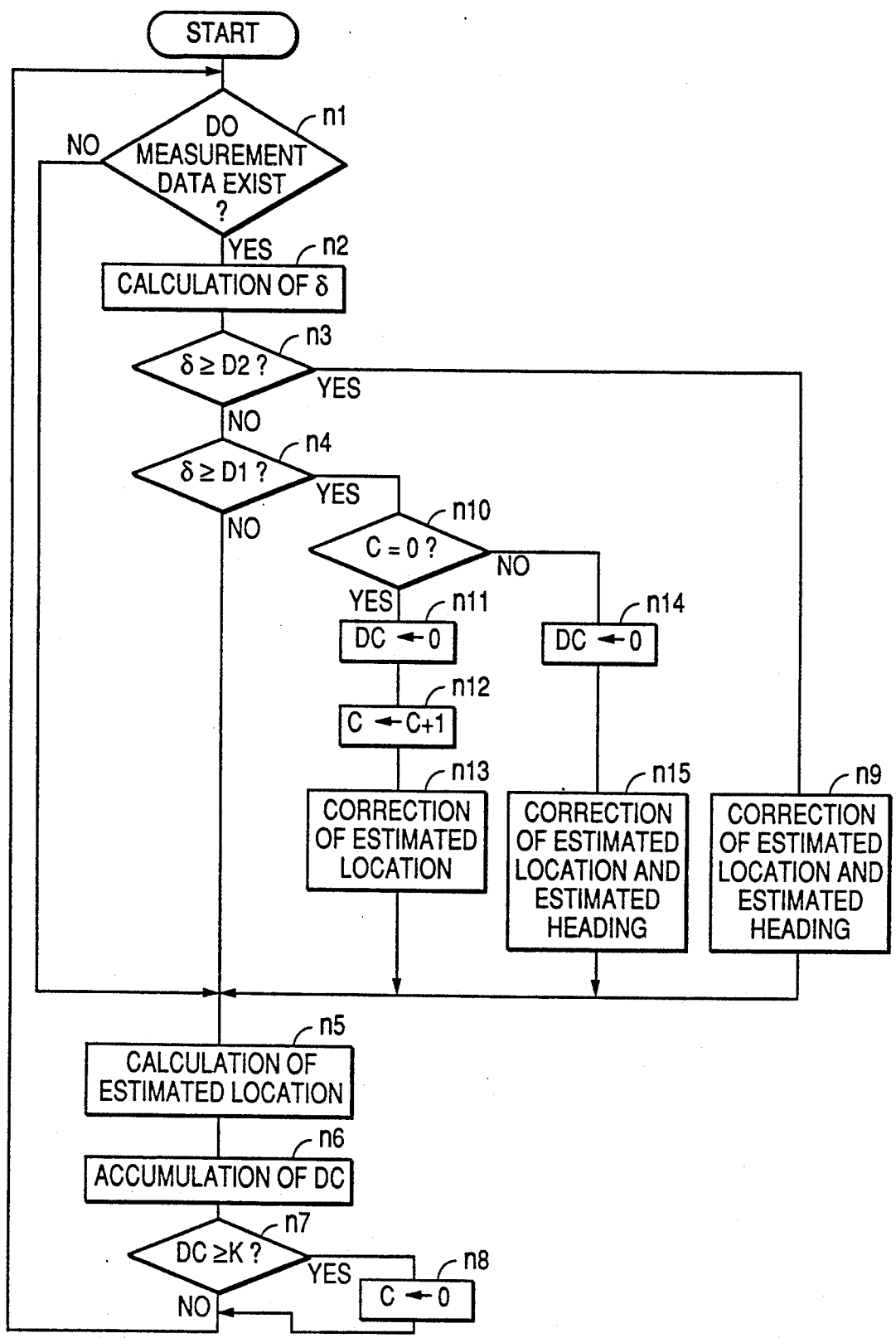
FIG. 2 is a flow chart showing how the estimated location and heading of a vehicle are corrected.

FIG. 2 shows how the estimated location and the estimated heading are corrected in the location detecting unit 3. In step n1, it is determined if the measurement data from the GPS receiver 1 exist. If NO, the step n1 advances to step n5, in which the estimated location is calculated without correction. On the other hand, if YES, the step n1 advances to step n2, in which a difference of location, $\delta$, between the location that the measurement data represent and the estimated location is calculated. In step n3, it is determined if the difference of location, $\delta$, is more than a predetermined value D2 (for example, 2 km) corresponding to a second predetermined value. If YES, the step n3 advances to step n9, the estimated location is corrected to the location that the measurement data from the GPS receiver 11 represent. At this time, the estimated heading is corrected to the heading (geomagnetic heading) sensed by the magnetic sensor 12. This is because, if the difference of location, $\delta$, is large, it can be supposed that a vehicle is moved with the navigation system switched off (for example, when a vehicle is ferried, the navigation system on the vehicle is usually turned off). That is, when the navigation system is turned off, the estimated location and the estimated heading immediately before the system is turned off are stored in the internal memory (not shown) of the system. Therefore, when the vehicle left the ferry boat, the estimated heading will be greatly departed from the actual heading of the vehicle, and the heading sensed by the magnetic sensor can be considered to be higher in reliability than the estimated heading. In consideration of this respect, the estimated heading is corrected in the step n9. After the correction, the step n9 advances to the step n5.

When the difference of location, $\delta$, is less than the predetermined value D2, the step n3 advances to step n4, in which it is determined if the difference of location, $\delta$, is more than a predetermined value D1 (for example, 250 m) corresponding to a first predetermined value. This predetermined value D1 is set in advance on the basis of the location detection accuracy of the GPS receiver 11. If the difference of location, $\delta$, is less than the predetermined value D1, then the step n4 advances to the step n5. If, on the other hand, the difference of location, $\delta$, is more than the predetermined value D1, i.e., if $D1 \leq \delta < D2$, the step n4 advances to step n10, in which it is determined if a location correction count value C is zero. The correction count value C corresponds to the number of times that the correction of the estimated location was made with the measurement data from the GPS receiver 11. If the correction count value C is zero, the step n10 advances to step n11, in which a distance count value DC is reset to zero. The distance count value DC corresponds to the distance traveled by the vehicle after the correction of the estimated location. The step n11 advances to step n12, in which the correction count value C is increased. The step n12 advances to step n13, in which the estimated location is corrected to the location that the measurement data from the GPS receiver 11 represent. At this time, without correcting the estimated heading, the location detecting unit 3 performs the estimation of a heading by adding the output of the gyro 2 to the previous estimated heading. After the correction of the estimated location, the step n13 returns back to the step n5.

In the step n5, the current location of the vehicle is estimated on the basis of the previous estimated location or the estimated location corrected with the measurement data from the GPS receiver 11, the integrated value of the gyro output over a predetermined period of time, and the integrated value of the wheel sensor output over the predetermined period of time. Location data corresponding to this current location are supplied to the control unit 5. The step n5 advances to step n6, in which a value corresponding to the distance traveled by the vehicle is accumulated to the distance count DC. In step n7, it is determined if the distance count value DC after the accumulation is more than a predetermined value K. This predetermined value K, for example, is set to a value corresponding to several kilometers. When the distance count value DC has reached the predetermined value K, the step n7 advances to step n8, in which the correction count value C is reset to zero. If the distance count value DC is less than the predetermined value K, the step n7 returns back to the step n1. After the correction count value C has been reset to zero, the step n8 also returns back to the step n1.

After the correction of the estimated location based on the measurement data from the GPS receiver 11 was made in the step n13, if the difference of location, $\delta$, becomes more than the predetermined value D1 before the distance count value DC reaches the predetermined value K, the step n4 advances to the step n10 and further to step n14. That is, since the correction count value C is not reset during the period after the correction of the estimated location based on the measurement data from the GPS receiver 11 was made and before the distance count value DC reaches the predetermined value K, the judgment in the step n10 becomes a negative one, and, therefore, the step n10 advances to step n14, in which the distance count value DC is reset. The step n14 advances to step n15, in which the estimated location is corrected to the location sensed by the GPS receiver 11. When the difference of location became large in spite of a short movement of the vehicle after the correction of the estimated location, there is the possibility that the estimated heading is inaccurate. Therefore, at the same time of the correction of the estimated location, in the step n15, the estimated heading is corrected to the heading sensed by the magnetic sensor 12. The step n15 returns back to the step n5.

When the difference of location, $\delta$, does not reach the predetermined value D1 until the distance count value DC reaches the predetermined value K, the correction count value C is reset by the processes in the steps n7 and n8. Therefore, when the difference of location, $\delta$, became large after the reset, the step n10 advances to the step n11. That is, when the difference of location, $\delta$, became large by a long movement of the vehicle, the estimated heading becomes higher in reliability than that sensed by the magnetic sensor 12, because a large error is not contained in the estimated heading. Therefore, the estimated heading is employed as it is.

As described above, if a large difference of location (more than the predetermined value D1) occurs again by a short movement (distance shorter than a distance corresponding to the predetermined value K) of a vehicle after the estimated location was corrected to the location detected by the GPS receiver 11, the estimated heading is corrected in accordance with the present invention to the heading detected by the magnetic sensor 12. That is, if the estimated heading is reduced in reliability, it is corrected with a geomagnetic heading that can be considered to be higher in reliability, so that the detection of location can be performed adequately. Therefore, unlike the prior art, the locus of the estimated location can be prevented from being formed into a serrate shape by the correction based on the location detected by the GPS receiver 11.

Also, if a very large difference of location (more than the predetermined value D2) occurs, the estimated heading is corrected to a geomagnetic heading independently of whether or not the estimated location was corrected before an occurrence of the large difference of location. Therefore, even in a case where a vehicle travels with the starting switch switched off (e.g., even in a case where a vehicle is ferried), the estimated heading that is totally meaningless when the vehicle start traveling again is corrected to a geomagnetic heading higher in reliability, so that the location of the vehicle can be estimated accurately from a period immediately after the vehicle start traveling. Note that, even if this process is omitted, it is possible to correct the estimated heading to a geomagnetic heading by the processes in the steps n14 and n15. But, in that case, it will take a long period of time to get a correct heading.

It is noted that the present invention is not limited to the embodiment described above. For example, the location detection in the location detecting unit 3 can be used together with a so-called map matching method in which an estimated location is corrected to a location on the neighboring road if the estimated location is departed from an actual road. Also, although in the above embodiment the turning angular velocity of a vehicle has been detected by the gyro, the detection of the turning angular velocity can also be made by detecting a difference between the left and right wheel speeds. Also, the gyro may comprise a mechanical type gyro, vibration gyro, optical fiber gyro or the like. Further, the present invention has been described with reference to vehicles, but it can also be applicable for the location detection of moving bodies such as aircraft and ships.

While the subjection invention has been described with relation to the preferred embodiment, various modifications and adaptations thereof will now be apparent to those skilled in the art. All such modifications and adaptations as fall within the scope of the appended claims are intended to be covered thereby.

What I claim is:

1. A location detecting apparatus comprising:
   autonomous location detecting means mounted in a moving body to calculate a distance traveled by said moving body and an estimated heading of said moving body and to detect an estimated location of said moving body on the basis of said distance traveled and said estimated heading;
   receiving means for detecting a location of said moving body by receiving waves from satellites circling around the Earth in predetermined orbits and for providing location information corresponding to the detected location;
   means to detect a difference of location between said location detected by said receiving means and said estimated location detected by said autonomous location detecting means;
   location correcting means which corrects said estimated location to said location detected by said receiving means when said difference of location is more than a first predetermined value;
   a magnetic sensor for detecting an heading of said moving body by sensing a geomagnetic field; and
   heading correcting means which corrects said estimated heading calculated by said autonomous location detecting means to said heading detected by said magnetic sensor, when said difference of location is more than said first predetermined value after said estimated location was corrected by said location correcting means and before said moving body travels a predetermined distance.

2. A location detecting apparatus as set forth in claim 1, which further comprises means that, when said difference of location is more than a second predetermined value greater than said first predetermined value, corrects said estimated heading in said autonomous location detecting means to said heading detected by said magnetic sensor independently of whether or not said estimated location was corrected before an occurrence of the greater difference of location.

* * * * *